United States Patent
Tucker (10) Patent No.: US 10,460,221 B1
(45) Date of Patent: Oct. 29, 2019

(54) DISPLAYING A SEEDED, CONTINUOUSLY UPDATING IDENTIFIER IN A QR CODE

(71) Applicant: Ryan Crawford Tucker, Shoreline, WA (US)

(72) Inventor: Ryan Crawford Tucker, Shoreline, WA (US)

(73) Assignee: Ryan C. Tucker, Shoreline, WA (US)

( * ) Notice: Subject to any disclaimer, the term of this patent is extended or adjusted under 35 U.S.C. 154(b) by 0 days.

(21) Appl. No.: 16/125,552

(22) Filed: Sep. 7, 2018

(51) Int. Cl.
   *G06K 19/06* (2006.01)
   *G06F 21/55* (2013.01)
   *G06F 7/58* (2006.01)

(52) U.S. Cl.
   CPC ....... *G06K 19/06037* (2013.01); *G06F 7/582* (2013.01); *G06F 21/552* (2013.01); *G06F 2221/034* (2013.01)

(58) Field of Classification Search
   CPC ... G06F 21/36; G06F 21/42; G06K 19/06009; G06K 9/00771; G06Q 20/3274; G06Q 20/3672; G06Q 20/385; G06Q 30/0212; G06Q 30/0218; G06Q 30/0245; G06Q 40/08; G06Q 50/18; G08B 13/19613; G08B 13/19647; G08B 13/19658; G08B 13/19684; G11B 20/0021
   See application file for complete search history.

(56) References Cited

U.S. PATENT DOCUMENTS

| | | | |
|---|---|---|---|
| 8,694,438 B1 * | 4/2014 | Jernigan | G06Q 20/204 705/67 |
| 2013/0139233 A1 * | 5/2013 | Maity | H04L 63/08 726/7 |
| 2014/0279556 A1 * | 9/2014 | Priebatsch | G06Q 20/322 705/67 |
| 2017/0006026 A1 * | 1/2017 | An | H04L 63/0838 |
| 2017/0098264 A1 * | 4/2017 | Priebatsch | H04W 4/21 |
| 2017/0193543 A1 * | 7/2017 | Priebatsch | G06Q 30/0238 |
| 2018/0041339 A1 * | 2/2018 | Lee | H04L 9/08 |
| 2018/0220189 A1 * | 8/2018 | Hodge | G06Q 40/08 |
| 2018/0308116 A1 * | 10/2018 | Maggio | G06Q 30/0218 |

* cited by examiner

*Primary Examiner* — Thien M Le (57) ABSTRACT

A method for displaying a seeded, continuously updating identifier in a QR code and a QR code display and replay attack prevention device that displays a seeded, continuously updating identifier displayed in a QR code are disclosed. This method and QR code display and replay attack prevention device has a changing QR code, preventing replay attacks. The QR code display and replay attack prevention device has a small form factor, is low powered, is inexpensive, and requires no connectivity to the internet.

10 Claims, 4 Drawing Sheets

DISPLAYING A SEEDED, CONTINUOUSLY UPDATING IDENTIFIER IN A QR CODE

BACKGROUND

Embodiments of the invention described in this specification relate generally to displaying a seeded, continuously updating identifier in a QR code, and more particularly, to a device that displays a seeded, continuously updating identifier in a QR code and a method for displaying a seeded, continuously updating identifier in a QR code.

Most QR codes have static values because they typically reference static information or a stable resource (unchanging, at least for a time). Unfortunately, QR codes with static values lend themselves to exploitation. Other non-static QR codes require computers or smart devices in order to get updating QR values. QR codes with changing values have the benefit of reducing much of the exploitation seen with static QR codes. However, existing systems that have changing QR code values typically require a smart device (like a smartphone, a tablet computing device, etc.). As a result, being able to deploy a QR code with updating values is expensive and involves some manner of connectivity to one or more other devices. This is a problem for many who would like to deploy QR codes in more independent ways with no or low power consumption and reduced or eliminated connectivity to other devices.

Therefore, what is needed is a way to prevent replay attacks in a small, low powered, inexpensive, and independently operating manner.

BRIEF DESCRIPTION

A novel method for displaying a seeded, continuously updating identifier in a QR code and a QR code display and replay attack prevention device that displays a seeded, continuously updating identifier displayed in a QR code are disclosed. In some embodiments, the QR code display and replay attack prevention device has a changing QR code, which prevents replay attacks. In some embodiments, the QR code display and replay attack prevention device has a small form factor, is low powered, is inexpensive, and requires no connectivity to the internet.

In some embodiments, the method for displaying a seeded, continuously updating identifier in a QR code includes a plurality of steps comprising (i) initializing a micro-controller with QR code generation software, identifier generation software, and an identifier seed, (ii) generating an identifier by the micro-controller and turning the identifier into a QR code, and (iii) visually outputting the identifier as QR code, by the micro-controller, for display on one of a screen and an e-paper display.

In some embodiments, the method is performed by the QR code display and replay attack prevention device to continuously change the identifier displayed in the QR code, thereby preventing replay attacks.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel method for displaying a seeded, continuously updating identifier in a QR code and a QR code display and replay attack prevention device that displays a seeded, continuously updating identifier displayed in a QR code are disclosed. In some embodiments, the QR code display and replay attack prevention device has a changing QR code, which prevents replay attacks. In some embodiments, the QR code display and replay attack prevention device has a small form factor, is low powered, is inexpensive, and requires no connectivity to the internet.

In some embodiments, the method for displaying a seeded, continuously updating identifier in a QR code includes a plurality of steps comprising (i) initializing a micro-controller with QR code generation software, identifier generation software, and an identifier seed, (ii) generating an identifier by the micro-controller and turning the identifier into a QR code, and (iii) visually outputting the identifier as QR code, by the micro-controller, for display on one of a screen and an e-paper display.

As stated above, most QR codes are static values lending themselves to exploitation. Systems that have changing QR code values usually require a smart device (like a phone or tablet). Furthermore, most uses for QR codes are static values. Others require computers or smart devices in order to get updating QR values. Embodiments of the invention described in this specification solve such problems by providing a mechanism for using a changing identifier in a QR that prevents exploitation of a static QR value without requiring a smart device (like a phone or tablet).

Figure 1:
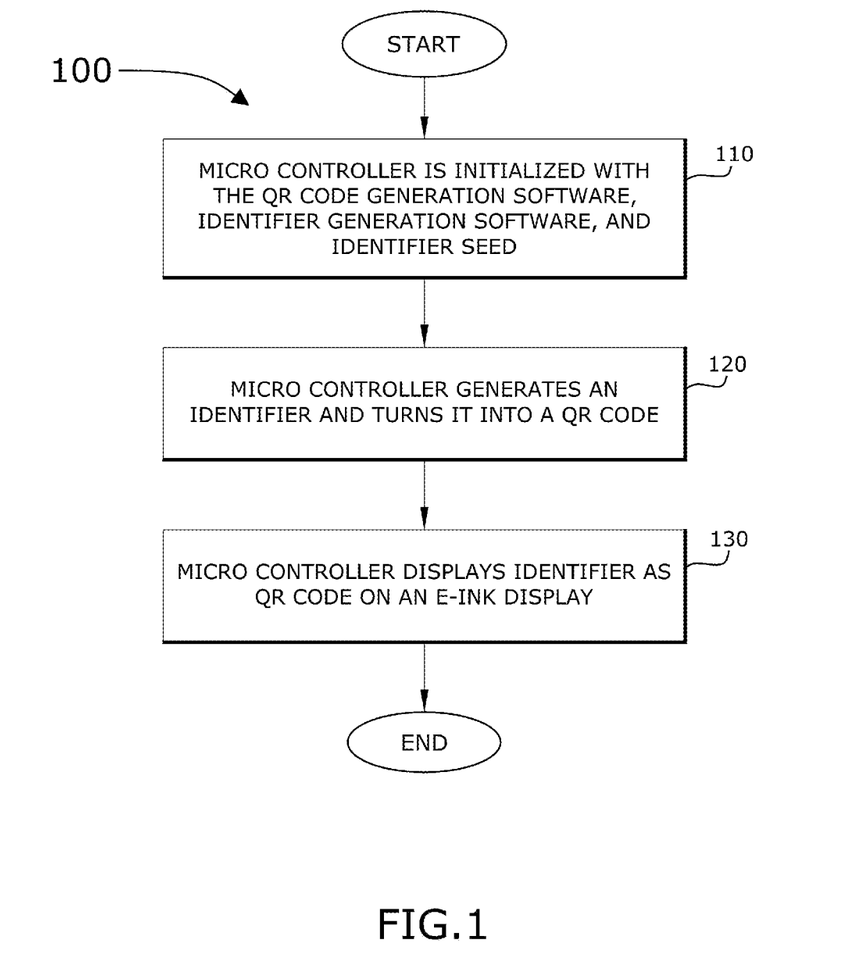
FIG. 1 conceptually illustrates a method for displaying a seeded, continuously updating identifier in a QR code in some embodiments.

By way of example, FIG. 1 conceptually illustrates a method for displaying a seeded, continuously updating identifier in a QR code 100. In some embodiments, the method for displaying a seeded, continuously updating identifier in a QR code 100 is performed by a QR code display and replay attack prevention device that continuously generates and displays a changing QR code. An example of a QR code display and replay attack prevention device is described below, by reference to FIG. 2. In some embodiments, the method for displaying a seeded, continuously updating identifier in a QR code 100 starts with initialization (at 110) of the micro-controller with the QR code generation software, the identifier generation software, and the identifier seed. In some embodiments, the identifier seed is installed and initialized on the micro-controller as built in the identifier generation software.

In some embodiments, the method for displaying a seeded, continuously updating identifier in a QR code 100 continues to the next step (at 120) during which the micro-controller generates an identifier and turns it into a QR code. In some embodiments, the method for displaying a seeded, continuously updating identifier in a QR code 100 uses the identifier seed installed and initialized on the micro-controller to generate a new identifier. Once a new identifier is generated, the identifier is converted to a QR code and is ready to be visually output onto the display device.

Finally, the method for displaying a seeded, continuously updating identifier in a QR code 100 of some embodiments proceeds to the last step (at 130) during which the micro-controller displays the identifier as the QR code on a display device, such as an e-ink display or an LCD screen. Thus, in some embodiments, when a new QR code is generated with an updated identifier, the display device is updated with the new QR code.

Embodiments of the QR code display and replay attack prevention device and method for displaying a seeded, continuously updating identifier in a QR code described in this specification differ from and improve upon currently existing options. In particular, some embodiments differ from existing systems that provide QR codes that change over time because the existing systems typically require access to a computer or smart device. In contrast, the QR code display and replay attack prevention device and method for displaying a seeded, continuously updating identifier in a QR code of the present disclosure is a self contained display, with reduced (low) power consumption and low system complexity, with a low cost of use.

In addition, some embodiments of the QR code display and replay attack prevention device and method for displaying a seeded, continuously updating identifier in a QR code improve upon the currently existing systems that typically use only a static QR code in the absence of a computer or smart device for changing the QR code over time. The problem is that a static QR code can be exploited when used for customer identification as the value never changes. As such, these existing, conventional systems are vulnerable to replay attacks. Furthermore, the existing, conventional systems that require access to a computer or smart device (to change the QR code over time) use a lot of power and physically take up a lot of space, as well as being expensive and complex (often requiring access to the internet). In contrast, the QR code display and replay attack prevention device of the present disclosure has a changing QR code, thereby preventing replay attacks. The form factor of the QR code display and replay attack prevention device is also small and power/energy requirements are low. Moreover, the QR code display and replay attack prevention device is inexpensive and does not require connectivity to the internet.

The QR code display and replay attack prevention device and method for displaying a seeded, continuously updating identifier in a QR code of the present disclosure may be comprised of the following elements. This list of possible constituent elements is intended to be exemplary only and it is not intended that this list be used to limit the QR code display and replay attack prevention device and method for displaying a seeded, continuously updating identifier in a QR code of the present application to just these elements. Persons having ordinary skill in the art relevant to the present disclosure may understand there to be equivalent elements that may be substituted within the present disclosure without changing the essential function or operation of the QR code display and replay attack prevention device and method for displaying a seeded, continuously updating identifier in a QR code.

1. Micro-controller
2. Identifier seed
3. Identifier generator
4. Physical display medium, either a display screen (such as an LCD screen) or an e-ink display
5. QR code The QR code display and replay attack prevention device and method for displaying a seeded, continuously updating identifier in a QR code of the present disclosure generally works by way of the micro-controller, which is at the heart of the QR code display and replay attack prevention device and is responsible for running each step of the method for displaying a seeded, continuously updating identifier in a QR code to control the system. Specifically, the micro-controller is initialized with an identifier seed that is used to generate each subsequent identifier. The micro-controller includes identifier generator logic to generate a new identifier. Then the micro-controller creates a QR code with the identifier and displays the QR code on the physical display medium. In some embodiments, the physical display medium comprises an e-ink display. In some embodiments, the physical display medium comprises a display screen. In some embodiments, the display screen comprises an LCD screen. In some embodiments, the micro-controller repeats the process at set intervals. Specifically, it is well understood that micro-controllers typically and easily execute loops that run logic at specific intervals. Therefore, in order to generate a new identifier at a set interval, the micro-controller of the QR code display and replay attack prevention device of some embodiments checks if enough time has elapsed before generating a new identifier.

Figure 2:
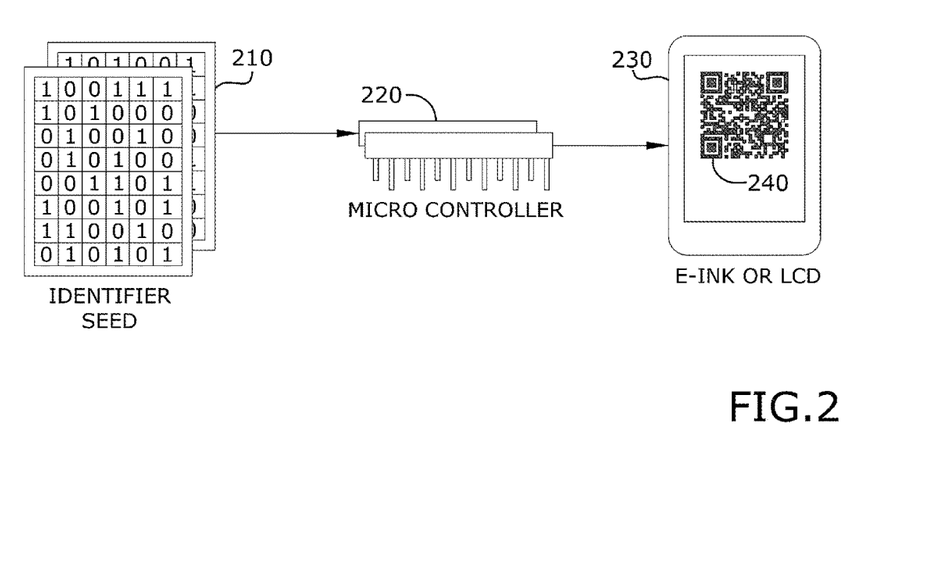
FIG. 2 conceptually illustrates a block diagram of a QR code display and replay attack prevention device in some embodiments.

By way of example, FIG. 2 conceptually illustrates a QR code display and replay attack prevention device 200 that continuously generates and displays a changing QR code. In some embodiments, the QR code display and replay attack prevention device 200 includes an identifier seed 210, QR code generation software (not shown in this figure), identifier generation software (not shown in this figure), and a micro-controller 220. In some embodiments, the QR code display and replay attack prevention device 200 further includes a display device 230 on which the continuously changing QR code 240 (with continuously changing identifier) is displayed.

In some embodiments, the identifier seed 210 (also known as a "seed state" or just "seed") is a number or array of numbers used to initialize a pseudorandom number generator. Pseudorandom number generators are not truly random as they are deterministic based on the value of the seed. However, if the seed is not known, pseudorandom number generators resemble a series of random numbers such that if a number is known at a particular time, it is difficult to predict what the next number is without knowing the seed. Since a string can be represented by an array of numbers, the seed for this invention could be a number, array of numbers, or a string.

In some embodiments, the micro-controller 220 could be a true micro-controller (like a PIC micro-controller), or it may be a small processing unit (like an Arduino, Teensy, Raspberry Pi, etc.). When the component is built, the QR code generation software, identifier generation software, and the identifier seed 210 will be installed on the micro-controller 220. Whether it is possible to reprogram the micro-controller 220 may be optional in order to prevent tampering of the identifier seed 210 or identifier generation software, or to prevent additional software from being installed.

In some embodiments, the display device is an e-ink display screen. In some embodiments, the display device is an LCD display screen. In some embodiments, the identifier generation software generates the values that go into the QR code 240. In some embodiments, the identifier generation software uses the identifier seed 210 in combination with another algorithm to generate a number to be used in the identifier. For example, the identifier generation software may use a seed, current time, and a hash function to generate a number. Alternatively, a seed may be used with a pseudorandom number generator that would generate the number. That generated number could then be appended to a URL such that the identifier generated by the identifier generation software would be a URL with the generated number appended. Therefore, the identifier generated by the identifier generation software may be a number, a string, or a combination of numbers and strings, which contains the generated number.

In some embodiments, the QR code generation software converts the identifier generated by the identifier generation software into the QR code 240 to be shown on the display device 230. As the identifier is continuously updated (e.g., updating at each interval of a timed interval), the QR code 240 in some embodiments is also continuously updated by the QR code generation software, which converts each updated identifier into the updated QR code 240 to be visually output onto the display device 230.

As shown in this figure, the QR code display and replay attack prevention device 200 has a small form factor, being made with at least the micro-controller and, in some configurations, a display device 230 or another type of display medium, such as an e-ink display or an LCD screen. In some embodiments, when the QR code display and replay attack prevention device 200 includes both the micro-controller 220 and the display device 230, a housing encapsulates the micro-controller in connection with the display device that is visible through a surface cutout of the housing. In some embodiments, when the QR code display and replay attack prevention device 200 does not include the display device 230, the micro-controller 220 connects to an external display device to display the continuously changing QR code 240. When no display device 230 is included, the QR code display and replay attack prevention device 200 is inexpensive, which allows for near universal adoption. Furthermore, the QR code display and replay attack prevention device 200, whether with or without a display device 230, does not require connectivity to the internet. Overall, the QR code display and replay attack prevention device 200 provides a simple, inexpensive, and virtually tamper-free way to prevent replay attacks in relation to the use and deployment of QR codes.

In some embodiments, the QR code display and replay attack prevention device includes a power source. Although the QR code display and replay attack prevention device is low powered, at least one source of power provides electric power to the micro-controller. In some embodiments, the source of power comprises a battery. In some embodiments, the source of power comprises a solar panel. In some embodiments, the source of power provides electric power to the micro-controller and the display device onto which the QR codes with continuously changing identifiers are visually output. In some embodiments, the battery is a battery bank comprising a plurality of batteries. In some embodiments, the solar panel comprises a plurality of solar panels.

Figure 3:
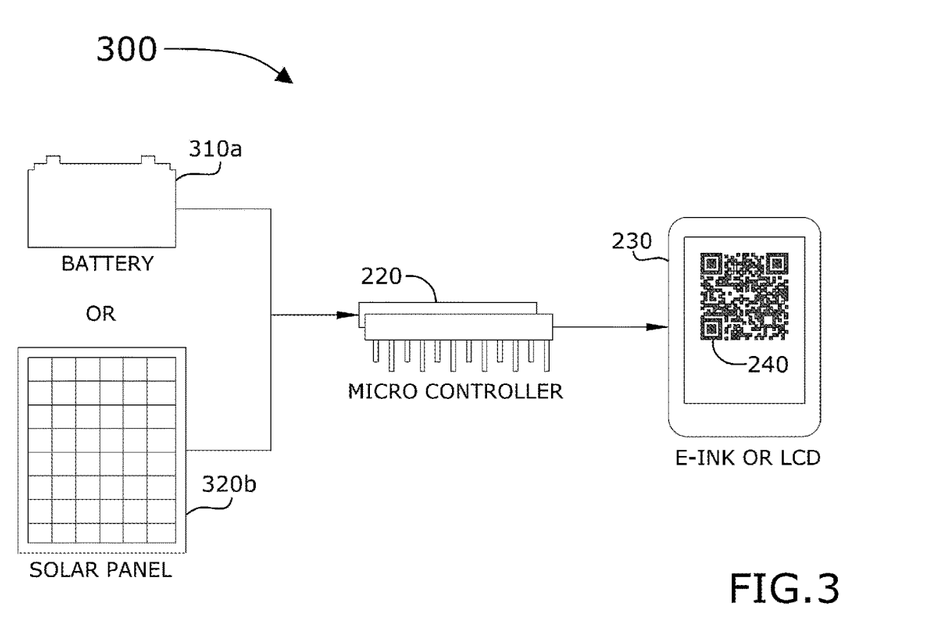
FIG. 3 conceptually illustrates a block diagram of a powered QR code display and replay attack prevention device in some embodiments.

By way of example, FIG. 3 conceptually illustrates an example of a powered QR code display and replay attack prevention device 300. As shown in this figure, the powered QR code display and replay attack prevention device 300 includes the identifier seed (not shown in this figure), the QR code generation software (not shown in this figure), the identifier generation software (not shown in this figure), the micro-controller 220, the display device 230, and either a battery power source 310*a* or a solar panel power source 310*b*. In some embodiments, the powered QR code display and replay attack prevention device 300 includes both the battery power source 310*a* and the solar panel power source 310*b*.

To make the QR code display and replay attack prevention device and method for displaying a seeded, continuously updating identifier in a QR code of the present disclosure, a person may program a micro-controller to initialize QR code generation software, identifier generation software, and an identifier seed, and after initialization, to generate new identifiers and display them in QR codes on an e-ink display or another type of display screen, such as an LCD display panel. Furthermore, prior to initialization and generation of identifiers and QR codes, the person may install the QR code generation software and the identifier generation software, if not already installed.

To use the method for displaying a seeded, continuously updating identifier in a QR code of the present disclosure, a person would use the QR code display and replay attack prevention device to continuously change QR values to prevent replay attacks against static QR codes. For example, if a QR code is being used to identify where a customer is located, that location could be spoofed by taking a picture of the static QR code and scanning it at a later time. However, a changing QR prevents this from occurring as the value of the QR code at an earlier time will not be the same at a later time. If a customer took a picture of the QR code and scanned it again later, it would be obvious that they are not at the original location anymore. Additionally, having a changing QR code by using a computer or smart device takes up a lot of space, is expensive, uses a lot of power, and is a complex computer system. Using a micro-controller takes up far less space, uses a lot less energy, costs a lot less money, and does not need to make any connection(s) to other computers or electronics.

In some embodiments, the method for displaying a seeded, continuously updating identifier in a QR code is performed by the QR code display and replay attack prevention device to continuously change the identifier displayed in the QR code during timed intervals, thereby preventing replay attacks. In some embodiments, the method for displaying a seeded, continuously updating identifier in a QR code is a high level method. In some embodiments, a detailed continuous timed QR generation method for displaying a seeded, time-updated identifier in a QR code includes an expanded plurality of steps comprising (i) initializing QR code generation software on the micro-controller, (ii) initializing identifier generation software on the micro-controller, (iii) initializing an identifier seed on the micro-controller, (iv) generating an identifier by the micro-controller and turning the identifier into a QR code, (v) visually outputting the identifier as QR code, by the micro-controller, for display on a physical display medium, (vi) determining whether to change the identifier and QR code, and (vii) waiting for a defined period of time before returning to generate the identifier and QR code.

Figure 4:
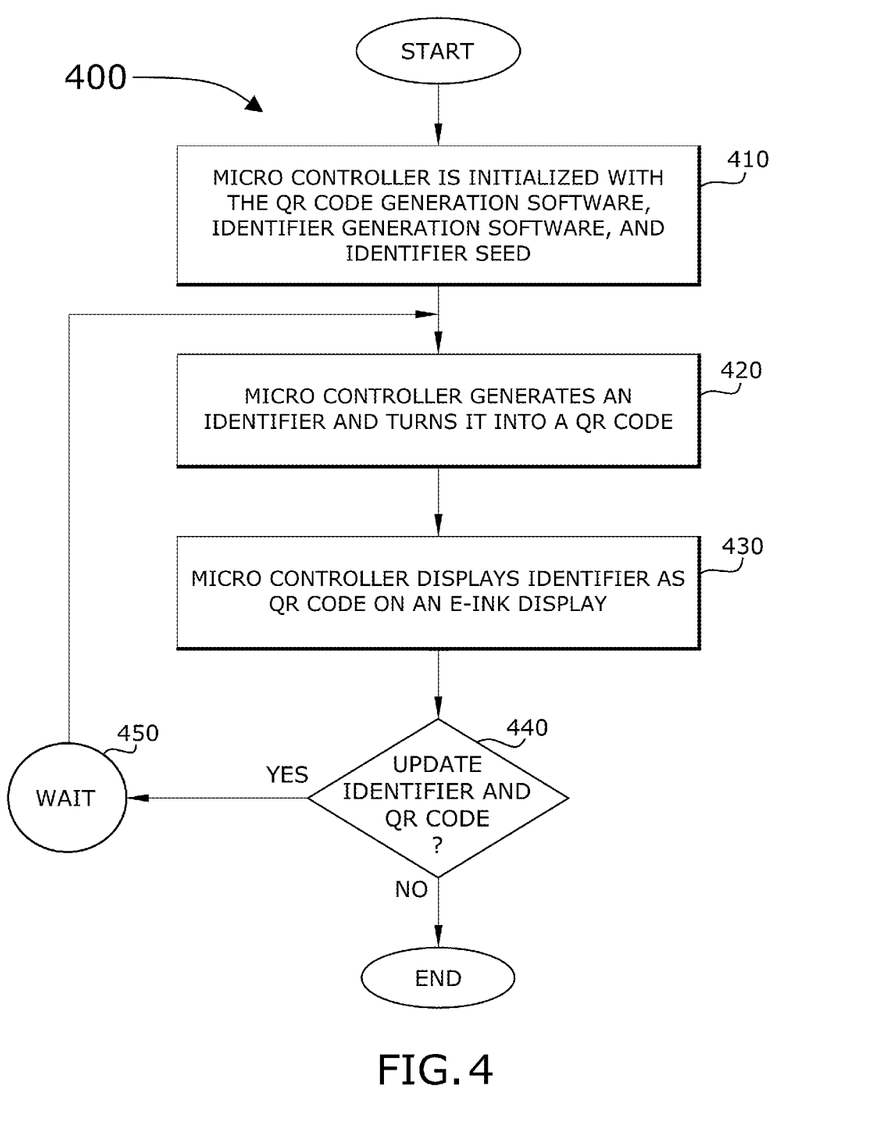
FIG. 4 conceptually illustrates a continuous timed QR generation method for displaying a seeded, time-updated identifier in a QR code in some embodiments.

By way of example, FIG. 4 conceptually illustrates a continuous timed QR generation method for displaying a seeded, time-updated identifier in a QR code 400. In some embodiments, the continuous timed QR generation method for displaying a seeded, time-updated identifier in a QR code 400 is performed by a QR code display and replay attack prevention device that continuously generates and displays a changing QR code. Examples of QR code display and replay attack prevention devices are described above, by reference to FIGS. 2-3. In some embodiments, the continuous timed QR generation method for displaying a seeded, time-updated identifier in a QR code 400 starts with initialization (at 410) of the micro-controller with the QR code generation software, the identifier generation software, and the identifier seed.

In some embodiments, the continuous timed QR generation method for displaying a seeded, time-updated identifier in a QR code 400 continues to the next step (at 420) during which the micro-controller generates an identifier and turns it into a QR code. Next, the continuous timed QR generation method for displaying a seeded, time-updated identifier in a QR code 400 of some embodiments proceeds to the next step (at 430) during which the micro-controller displays the identifier as the QR code on a display device, such as an e-ink display or an LCD screen.

In some embodiments, the continuous timed QR generation method for displaying a seeded, time-updated identifier in a QR code 400 determines (at 440) whether to continuing generating updated identifiers and corresponding updated QR codes for display onto the display device. When continued generation of updated identifiers and corresponding updated QR codes is determined, then the continuous timed QR generation method for displaying a seeded, time-updated identifier in a QR code 400 waits (at 450) for a defined time duration, and then returns to step 420, at which the micro-controller generates the updated identifier and corresponding updated QR code. Then the continuous timed QR generation method for displaying a seeded, time-updated identifier in a QR code 400 continues to display (at 430) the updated identifier and corresponding updated QR code on the display device, as is described above. The continuous timed QR generation method for displaying a seeded, time-updated identifier in a QR code 400 continues in this cycle, using the identifier seed and any other distinct input, such as the previous generated identifier or the present date and time, as input for generating the next identifier and corresponding QR code. If the QR code display and replay attack prevention device is shutdown or loses power, the continuous timed QR generation method for displaying a seeded, time-updated identifier in a QR code 400 ends.

In some embodiments, the QR code display and replay attack prevention device and method for displaying a seeded, continuously updating identifier in a QR code of the present disclosure could be adapted for use in a multi-factor authentication system where scanning the changing QR code could be used as an additional piece of information "that the user has", but only has for a short period of time, after which, the identifier in the QR code would change. In some embodiments, adding a solar panel to the QR code display and replay attack prevention device could improve mobility by allowing for a power source outside of a battery and without plugging into a wall socket.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
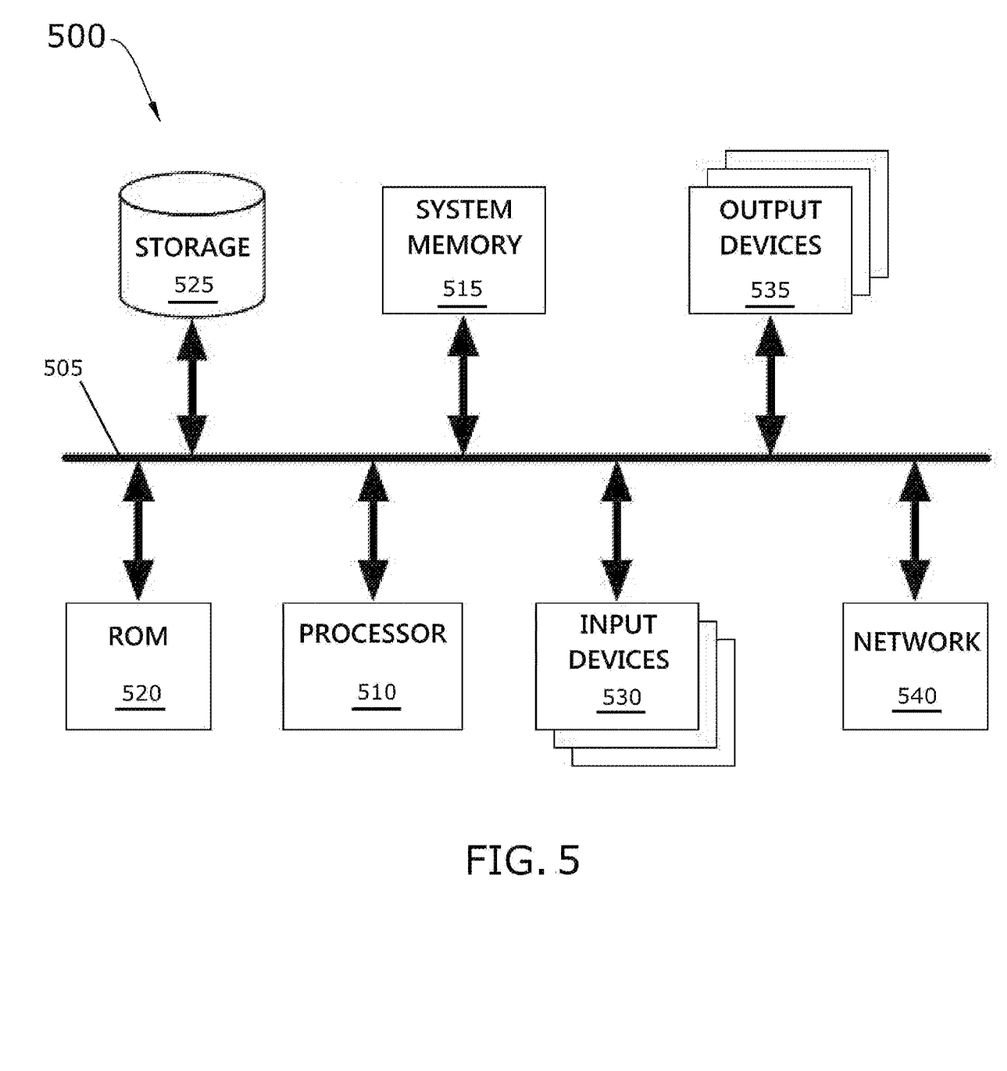
FIG. 5 conceptually illustrates an electronic system with which some embodiments of the invention are implemented.

FIG. 5 conceptually illustrates an electronic system 500 with which some embodiments of the invention are implemented. The electronic system 500 may be a micro-controller, such as a true micro-controller (e.g., a PIC micro-controller, etc.), or it may be a small processing unit (e.g., an Arduino, a Teensy, a Raspberry Pi, etc.)., or a computer, a phone (cell phone, mobile phone, smartphone, etc.), a PDA (iPod, other handheld computing device, etc.), or any other sort of electronic device or computing device. Such an electronic system includes various types of computer readable media and interfaces for various other types of computer readable media. Electronic system 500 includes a bus 505, processing unit(s) 510, a system memory 515, a read-only 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only 520. For example, the various memory units include instructions for processing appearance alterations of displayable characters in accordance with some embodiments. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as cathode ray tubes (CRT) or liquid crystal displays (LCD). Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, such as a micro-controller, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1 and 4 conceptually illustrate processes or methods in which the specific operations of these processes or methods may not be performed in the exact order shown and described. Specific operations may not be performed in one continuous series of operations, and different specific operations may be performed in different embodiments. Furthermore, the processes or methods could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which, when executed by a micro-controller, displays a seeded, continuously updating identifier displayed in a QR code, said program comprising sets of instructions for:

initializing QR code generation software on the micro-controller by a self-contained QR code display and replay attack prevention device in the absence of any external computing device;

initializing identifier generation software on the micro-controller by the self-contained QR code display and replay attack prevention device in the absence of any external computing device;

initializing an identifier seed on the micro-controller by the self-contained QR code display and replay attack prevention device in the absence of any external computing device;

generating a first identifier from the identifier seed by the micro-controller and turning the first identifier into a first QR code that refers to a particular information resource, said first QR code for display on a physical display medium by the self-contained QR code display and replay attack prevention device in the absence of any external computing device;

visually outputting the first identifier as the first QR code, by the micro-controller, for display on the physical display medium by the self-contained QR code display and replay attack prevention device in the absence of any external computing device;

generating a second identifier from the identifier seed by the micro-controller and turning the second identifier into a second QR code that refers to the particular information resource, said second QR code for display on the physical display medium by the self-contained QR code display and replay attack prevention device in the absence of any external computing device; and visually outputting the second identifier as the second QR code, by the micro-controller, for display on the physical display medium by the self-contained QR code display and replay attack prevention device in the absence of any external computing device.

2. The non-transitory computer readable medium of claim 1, wherein the program further comprises a set of instructions for determining whether to generate an updated identifier.

3. The non-transitory computer readable medium of claim 2, wherein the updated identifier comprises a third identifier that is different from the first identifier and the second identifier, wherein the program further comprises a sets of instructions for:
   waiting to generate the third identifier for a defined time duration;
   generating the third identifier after the defined time duration expires; and
   turning the third identifier in a third QR code that refers to the particular information resource.

4. The non-transitory computer readable medium of claim 1, wherein the identifier is visually output for display as a QR code on an e-ink display.

5. The non-transitory computer readable medium of claim 1, wherein the identifier is visually output for display as a QR code on a screen.

6. A QR code display and replay attack prevention device that displays a seeded, continuously updating identifier displayed in a QR code, said device comprising:
   an identifier seed;
   identifier generation software that uses the identifier seed to generate identifiers;
   QR code generation software that is used to turn the generated identifiers into QR codes;
   a micro-controller that is initialized with the identifier seed, the identifier generation software, and the QR code generation software, wherein the micro-controller uses the initialized seed in connection with the identifier generation software to continuously generate a new identifier that is used in connection with the QR code generation software to turn each continuously generated identifier into a new QR code;
   a low-energy power source that provides power to the micro-controller to continuously generate identifiers to turn into continuously updating QR. codes in the absence of any external computing device; and
   a physical display medium configured to visually output each new QR code associated with the generated identifier to refer to a particular information resource.

7. The device of claim 6, wherein the physical display medium comprises one of an e-ink display and an LCD screen.

8. The device of claim 6, wherein the identifier seed comprises at least one of a number and an array of numbers used to initialize a pseudorandom number generator.

9. The device of claim 6, wherein the identifier seed is used by the micro-controller to generate each subsequent identifier among a plurality of identifiers that are turned into a plurality of QR codes that refer to a particular information resource.

10. The device of claim 9, wherein the micro-controller uses QR code generation software to generate each QR code based on each subsequent identifier in the absence of any external computing device.

* * * * *